Jan. 23, 1973   TOSHIO MASE ET AL   3,712,972
ELECTRIC LIGHTER PLUG WITH INTERLOCKING MEANS
Filed May 30, 1972   2 Sheets-Sheet 2

United States Patent Office 3,712,972
Patented Jan. 23, 1973

3,712,972
ELECTRIC LIGHTER PLUG WITH INTERLOCKING MEANS
Toshio Mase, Nagoya, and Tsukasa Kondo, Aichi, Japan, assignors to Kabushiki Kaisha Tokai Rika Denki Seisakusho, Nishi-Kasugai-gun, Aichi-ken, Japan
Filed May 30, 1972, Ser. No. 257,934
Claims priority, application Japan, May 29, 1971, 46/44,485
Int. Cl. F23g 7/22
U.S. Cl. 219—267
2 Claims

ABSTRACT OF THE DISCLOSURE

A lighter plug which is used in the socket of a cigar lighter, in which a bushing which carries a knob is firmly fitted to a carrier shell by means of interlocking lugs provided on the shell and a projection provided on the bushing, whereby the securing of the bushing to the carrier is made without any staking operation.

---

This invention relates to an electric cigar lighter, and more specifically it relates to a lighter plug which may be used in the socket of a cigar lighter of the type currently used in automobiles and which comprises a metallic heating element cup at one end thereof, a bushing insertedly fitted into the cup at its other end and a knob fixed to said bushing by means of a male thread provided on the knob.

Presently, in a conventional lighter plug of the kind mentioned above, the securing of a cylindrical carrier shell of the plug to a bushing which carries a knob is made by bending ears provided on the carrier shell over the bushing. This requires a staking operation which makes the assembly of the parts of the lighter plug delicate and slow. In the present invention which shall be described below more in detail, however, such a staking operation is eliminated and the bushing is fixed to the carrier shell by first joining the bushing to a knob loosely by means of female and male threads provided, respectively, on the bushing and knob, inserting the bushing which now carries the knob into the carrier shell through the forward end thereof and then further rotating the bushing through the knob in a specific direction so as to tighten the connection between the knob and bushing, whereby the assembling procedure is considerably simplified.

In the accompanying drawing which illustrates a preferred embodiment of the present invention:

Figure 1:
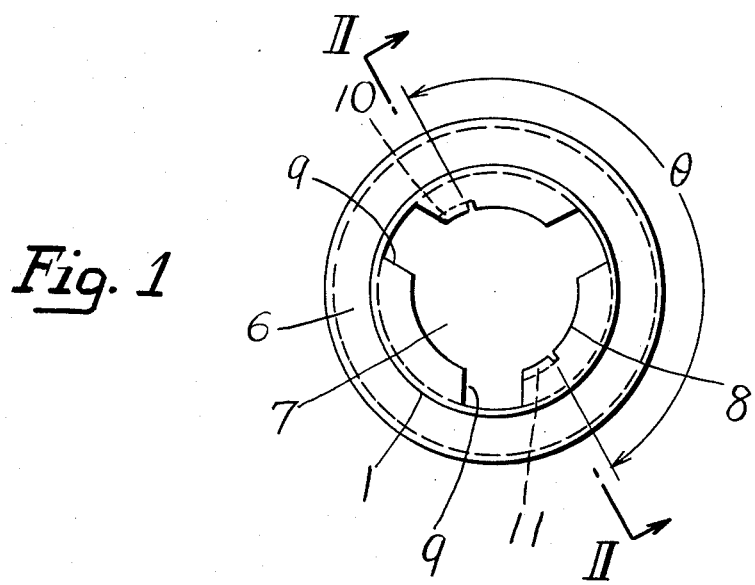
FIG. 1 is an end elevational view of the cylindrical carrier shell of the lighter plug.
Figure 2:
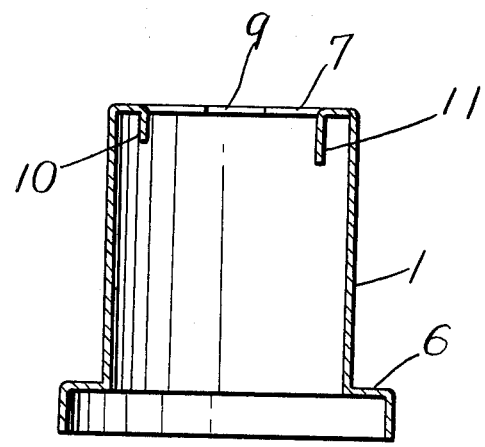
FIG. 2 is a sectional view of the carrier shell taken along the line II—II in FIG. 1.
Figure 3:
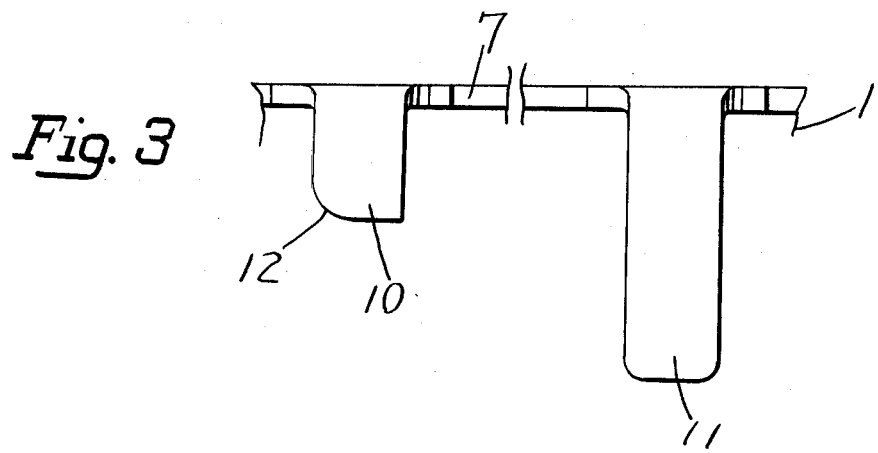
FIG. 3 is a partial developed and enlarged view of the carrier shell, showing particularly the interlocking or stopping lugs provided to the shell.
Figure 4:
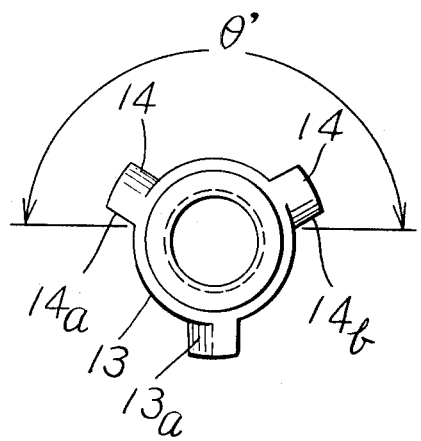
FIG. 4 is an elevational view of the bushing.
Figure 5:
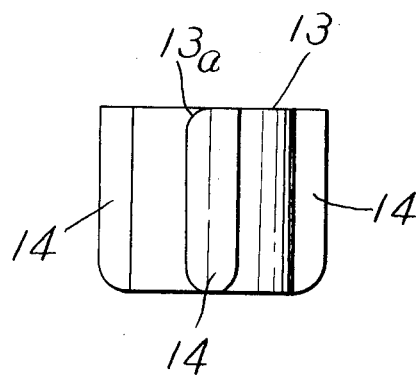
FIG. 5 is a side elevational view of said bushing.
Figure 6:
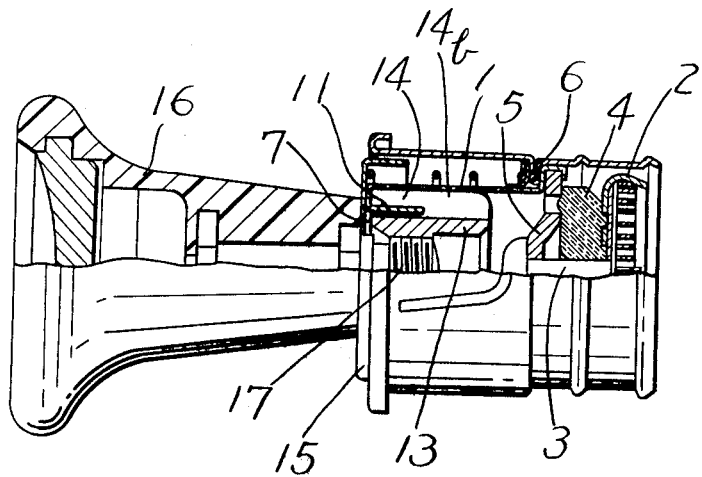
FIG. 6 is a partly cut-out side elevational view of the lighter plug assembled in accordance with the present invention.

Now referring to the drawing, the cylindrical carrier shell 1 has at its forward free end an opening surrounded by a flange 6 which extends radially outwardly from said opening. A metallic heating element cup 2, an insulating spacer 4 and a grounded plate 6, which are coaxially aligned, are fixed to each other by a stud 3. This heating unit is fixed to the carrier shell by inserting the plate 5 into the flange 6 and bending the outer edge of said flange 6 over the said plate 5. Said cylindrical carrier shell 1 has at its other end an opening 7 opposite to the opening in which the heating unit is fitted. Said opening 7 allows a bushing 13 to enter into the carrier shell 1 as described below. Said bushing 13 is cylindrical and provided on its circumferential wall with three interlocking projections 14 which are made integrally with the bushing, extend axially of the entire axial length of the bushing and project radially outwardly from the circumferential wall of bushing. Each of said projections 14 has a rounded upper end 13a sloped towards the turning or driving direction of a female thread which is provided centrally of the bushing and which receives the male screw thread 17 of a knob 16. The above-mentioned opening 7 has cuts 9 which extend radially outwardly from the circular edge 8 of the opening 7 in equiangularly arrangement thereabout, and the number and configuration of which correspond to those of the projections 14. The configuration of the opening 17 with the cuts 9 coincides thus with the elevational outer configuration of bushing 13, and therefore, the latter can be inserted into the shell 1. Interlocking or stopping lugs 10 and 11 are provided on the carrier shell 1 so as to project downwardly and inwardly of the shell from the edge 8 of the opening 7. The bases of said lugs 10 and 11 are located somewhat radially outwardly of said edge 8 so that they can be in the path of movement, along which the projections 14 move when they are rotated integrally with the bushing 13 within the shell 1. As best shown in FIGS. 1, 2 and 3, the lug 10 is located next to one of the cuts 9 in the turning direction of female thread of bushing, viz, clockwise in the drawing, and is comparatively short. The other lug 11 having a comparatively long length is located along the edge 8 with an angular distance $\theta$ from the lug 10. Said distance $\theta$ is designed so as to be substantially equal to a distance $\theta'$ between the remote lateral sides 14a and 14b of the adjacent two projections 14 and 14 for a purpose explained hereafter. At the free end of said shorter lug 10, there is provided a guide slope 12. Numeral 15 represents a flanged disc plate covering the exposed end of shell 1.

In the lighter plug of the present invention, the knob 16 and bushing 13 can be secured to the carrier shell 1 by the following operations.

The male thread 17 of knob 16 is screwed a little into the female thread of bushing 13. The bushing is then introduced into the shell 1 and loosely received within the shell so that it is rotatable and also movable in its axial direction. The axial movement of said bushing inwardly of the shell or its degree of depth of insertion into the shell is, however, limited by the abutment of knob 16 with the edge 8 of the outer opening 7. It should be noted, in this connection, that the lug 10 is designed so as to be shorter than said degree of depth, whereas the lug 11 is longer than said degree of depth. Hence, when the knob 16 is manually rotated clockwise in the drawing, the interlocking projection 14 which is located closest to the lug 10, abuts at its round 13a with the guide slope 12 of said lug 10 and passes under said lug 10, being moved inwardly as a whole with the knob 16. At the very moment when said one interlocking projection 14 has passed under the lug 10, another projection 14 which is located at the leading side with respect to the rotation of bushing, abuts at its side 14b the lug 11, whereby rotary movement of the bushing is prevented. At this position, the upper surfaces of all of the projections 14 are under the edge 8 where there is not provided any cut 9. Hence, further rotation of the knob 16 brings the bushing 13 towards the knob, and makes the side 14a of the projection come into engagement with the lug 10 at the trailing side with respect to the turning direction of the knob and bushing. Further rotation of the knob makes all of the projections 14 abut with the inner surface of edge 8, whereby the said edge is firmly sandwiched between the knob and bushing and concurrently the knob and bushing are tightly secured with respect to the shell 1. It should be noted that the lug 11 works to prevent the rotation of the bushing in its locking direction, while another lug 10 works to prevent the bushing from returning to its unfastening direction.

While in the above embodiment, a male thread is provided on the knob, it might be provided on the bushing. And, while in the above embodiment a plurality of projections 14 are provided to the bushing, they might be single so far as the width of such single projection coincides with the abovementioned angular distance $\theta$.

What is claimed is:

1. An electric lighter plug for use in the socket of a cigar lighter of the type used in automobiles, which comprises
   a cylindrical carrier shell,
   an electric heating unit fitted in one end of said shell,
   a bushing fitted into the other end of said shell,
   a knob carried by said bushing,
   said other end of said shell having an opening, the configuration of which corresponds to the outer configuration of said bushing whereby said bushing can be inserted into said shell through said opening in a direction coaxial with said shell,
   screw means threadedly connecting said knob and said bushing,
   at least two lugs provided on said shell to project from the edge of said opening into the shell,
   one of said lugs being comparatively short and the other lug being comparatively long and being located at a specific angular distance from said short lug,
   at least one projection being located on said bushing so as to be within an orbital path connecting said two lugs,
   the angular distance between a side of said projection at its forwardmost position with respect to the turning direction of said screw means and a side of said projection at its rearmost position with respect to said turning direction being substantially equal to said specific angular distance, whereby said projection passes under the short lug and abuts at its forwardmost side with said long lug, upon rotation of the knob and bushing, so that said bushing is prevented from further rotation and thereby said screw means begins to come into engagement, and said projection abuts at its rearmost wall with the short lug as said screw means is threaded home.

2. A lighter plug as claimed in claim 1 in which a plurality of projections is provided on said bushing.

References Cited

UNITED STATES PATENTS

| | | | |
|---|---|---|---|
| 2,260,588 | 10/1941 | Smith | 219—267 X |
| 2,338,565 | 1/1944 | Ashton et al. | 219—267 |
| 2,657,297 | 10/1953 | Johnson | 219—267 |
| 3,462,581 | 8/1969 | Bristol et al. | 219—267 |
| 3,519,794 | 7/1970 | Edwards | 219—267 |

VOLODYMYR Y. MAYEWSKY, Primary Examiner

U.S. Cl. X.R.

219—262